US007970524B2

(12) United States Patent
Gruenter

(10) Patent No.: US 7,970,524 B2
(45) Date of Patent: Jun. 28, 2011

(54) SAFETY CONCEPT IN ELECTRONIC THROTTLE CONTROL OF INTERNAL COMBUSTION ENGINE CONTROLLERS

(75) Inventor: Thomas Gruenter, Steinheim-Höpfigheim (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 529 days.

(21) Appl. No.: 12/168,324

(22) Filed: Jul. 7, 2008

(65) Prior Publication Data

US 2009/0012670 A1 Jan. 8, 2009

(30) Foreign Application Priority Data

Jul. 7, 2007 (DE) ......................... 10 2007 031 769

(51) Int. Cl.
*F02D 41/22* (2006.01)
*G06F 19/00* (2006.01)

(52) U.S. Cl. ............. 701/84; 701/29; 701/101; 123/399

(58) Field of Classification Search .................... 701/84, 701/29, 74, 71, 101, 104; 123/399, 406.44, 123/179.3

See application file for complete search history.

(56) References Cited

U.S. PATENT DOCUMENTS 5,880,568 A 3/1999 Bederna et al.
6,251,044 B1 6/2001 Streib
6,305,347 B1 10/2001 Russell
2007/0051334 A1 * 3/2007 Juenemann et al. ........ 123/179.3
2009/0078235 A1 * 3/2009 Moriya et al. ........... 123/406.44

FOREIGN PATENT DOCUMENTS

DE 44 38 714 A1 5/1996
DE 198 36 845 A1 2/2000
DE 101 05 507 B4 10/2001

OTHER PUBLICATIONS

Robert Bosch GmbH, "Ottomotor-Management", Oct. 2005, p. 241.

* cited by examiner

*Primary Examiner* — Tan Q Nguyen

(57) ABSTRACT

In a method for monitoring a function computer in a control unit which controls the generation of torque by an internal combustion engine, a maximum acceptable torque value is determined from a driver request. A torque actual value is determined from operational characteristic variables of the internal combustion engine and is compared with the maximum acceptable value. The air supply is limited when there is an unacceptably large actual value. The method is distinguished by the fact that the limitation takes place when a fault counter reading exceeds a threshold value. The fault counter reading is increased if the torque actual value is higher than the maximum acceptable torque value and is reduced by a predetermined value if the torque actual value is lower than the maximum acceptable value. In addition, a control unit which is configured to carry out the method is presented.

18 Claims, 3 Drawing Sheets

SAFETY CONCEPT IN ELECTRONIC THROTTLE CONTROL OF INTERNAL COMBUSTION ENGINE CONTROLLERS

CROSS-REFERENCE TO RELATED APPLICATION

This application claims the priority, under 35 U.S.C. §119, of German application DE 10 2007 031 769.9, filed Jul. 7, 2007; the prior application is herewith incorporated by reference in its entirety.

BACKGROUND OF THE INVENTION

Field of the Invention

The invention relates to a method for monitoring a function computer in a control unit which controls the generation of torque by an internal combustion engine. A maximum acceptable torque value is determined from a driver request and a torque actual value is determined from operational characteristic variables of the internal combustion engine and is compared with the maximum acceptable value. An air supply is limited when there is an unacceptably large actual value.

The publication Ottomotor-Management, Motronic-Systeme [Spark Ignition Engine Management, Motronic Systems], Robert Bosch GmbH, 2003, ISBN-3-7782-2029-2 discloses a method for monitoring a function computer in a control unit, which computer controls the generation of torque by an internal combustion engine, with a maximum value for the torque which is to be generated by the internal combustion engine being determined from a request of the driver, the maximum value being compared with an actual value of the torque which is actually generated by the internal combustion engine, and a state which can be controlled being ensured by suitable measures if the actual value is higher than the maximum value. In the case of control units which are used in series, the state which can be controlled is ensured by limiting the air supply to the internal combustion engine.

The function computer controls the generation of torque in dependence on specific input variables by employing algorithms stored in a program memory of the control unit. Important input variables are the rotational speed of the internal combustion engine and an accelerator pedal position which characterizes a torque request by a driver, that is to say a driver request. Modern control units also take into account a large number of further input variables which are derived from information from setpoint value signal transmitters and sensors.

The function computer forms from these input variables actuation signals for actuators with which the torque of the internal combustion engine is set. An important example of such an actuator is an air mass flow rate actuator, for example an electronically controlled throttle valve, which controls an air mass flow rate or fuel/air mixture flow rate flowing into the internal combustion engine.

Such systems, also referred to as EGAS systems (electronic throttle control systems) make stringent requirements in terms of the operational reliability of the components involved since there is no longer a mechanical coupling between the accelerator pedal as a driver request signal transmitter and the throttle valve as actuator. In order to prevent undesirably large torque values being incorrectly generated due to malfunctions of the function computer, a monitoring module monitors the function computer and in the case of a fault it initiates equivalent measures with which the torque of the internal combustion engine is limited for safety reasons.

The most effective limitation is carried out by limiting the air supply to the internal combustion engine to below a minimum value which is implemented, for example, by a mechanical stop when the throttle valve closes or an air flow cross section which is inevitably still open when the throttle valve is closed. Under normal operating conditions, the limitation generally does not take place until the faulty generation of the excessively large torque lasts beyond a time interval of the order of magnitude of half a second.

Independently of such a limitation of the torque in fault cases, usual functions of the internal combustion engine controller provide temporary reductions in the torque. Examples of such usual functions are limitation of the maximum rotational speed, which prevents the internal combustion engine from overspeeding, and a traction control operation which prevents the driven wheels from speeding. Both functions use ignition angle interventions and/or interventions into the injection of fuel in order to reduce torque.

In trials it has become apparent that in the case of interventions by usual functions faults in the function computer which lead to faulty generation of undesirably high torque values have not been detected until comparatively late, and in extreme cases not until a time of a minute has been exceeded.

This is basically undesired because steep and large amplitudes in the torque profile of the internal combustion engine can occur. If a driver reduces his torque request on, for example, a smooth underlying surface and if the function computer controls the internal combustion engine incorrectly, the usual traction controller will reduce the torque by ignition angle interventions. Delayed detection of the malfunction of the function computer will then lead to the ignition angle interventions taking place in each case when there are large internal combustion engine charges of the internal combustion engine, which leads to the undesirably large amplitudes of the torque fluctuations.

SUMMARY OF THE INVENTION

It is accordingly an object of the invention to provide a safety concept in an electronic throttle control of internal combustion engine controllers that overcome the above-mentioned disadvantages of the prior art devices and methods of this general type, which has improved monitoring of a control unit of the type mentioned at the beginning.

With the foregoing and other objects in view there is provided, in accordance with the invention a method for monitoring a function computer in a control unit which controls a generation of torque by an internal combustion engine. The method includes the steps of: determining a maximum acceptable torque value from a driver request; determining a torque actual value from operational characteristic variables of the internal combustion engine; comparing the maximum acceptable torque value to the torque actual value; limiting an air supply when the torque actual value is unacceptably large; performing the limiting step when a fault counter reading exceeds a threshold value; increasing the fault counter reading if the torque actual value is higher than the maximum acceptable torque value; and reducing the fault counter reading by a predetermined value if the torque actual value is lower than the maximum acceptable torque value.

A significant advantage of the invention is significantly faster limitation of the air supply in reaction to an EGAS malfunction (electronic throttle control malfunction) even when torque interventions by usual functions occur in parallel with the EGAS malfunction.

If a comparison is made between situations in which the intention was to detect an EGAS malfunction which has been brought about in a first case without torque reduction and in a second case with torque reductions which are carried out in parallel by usual functions, it becomes apparent that the waiting time between an initial occurrence of the EGAS malfunction and the limitation of the torque which is triggered in reaction to this malfunction in the second case is only approximately one and a half times as long as in the first case. Therefore, in practical trials an extension of the waiting time period of approximately 500 ms to approximately 700 to 800 ms has resulted, for example. This constitutes a large advantage over the prior art mentioned at the beginning, in which the limitation under comparable circumstances has in extreme cases not been triggered until after a time of a minute has been exceeded.

In accordance with an added mode of the invention, there is the further step of reducing the fault counter reading to a positive value or reducing the fault counter reading to a value zero if a counter reading remaining after a reduction by the predetermined value would be equal to zero or would be negative.

In accordance with another mode of the invention, there is the step of carrying out the method in parallel with interventions triggered by a usual function.

In accordance with an additional mode of the invention, there is the step of resetting an increased fault counter reading to an initial value for the fault counter reading when the maximum acceptable torque value is undershot if no interventions by the usual functions take place in parallel.

In accordance with further feature of the invention, the usual function is a traction control operation or an operation for limiting a maximum rotational speed.

In accordance with another further mode of the invention, there is the step of limiting a generation of torque by limiting the air supply to the internal combustion engine in an event of a fault.

In accordance with another added mode of the invention, there is the step of performing the interventions triggered by the usual function in one of a fuel path and an ignition angle path.

In accordance with a concomitant mode of the invention, there is the step of carrying out the method above a rotational speed threshold, and in that an increased fault counter reading below the rotational speed threshold is reset to an initial value for the fault counter reading when the maximum acceptable torque value is undershot.

Other features which are considered as characteristic for the invention are set forth in the appended claims.

Although the invention is illustrated and described herein as embodied in a safety concept in an electronic throttle control of internal combustion engine controllers, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
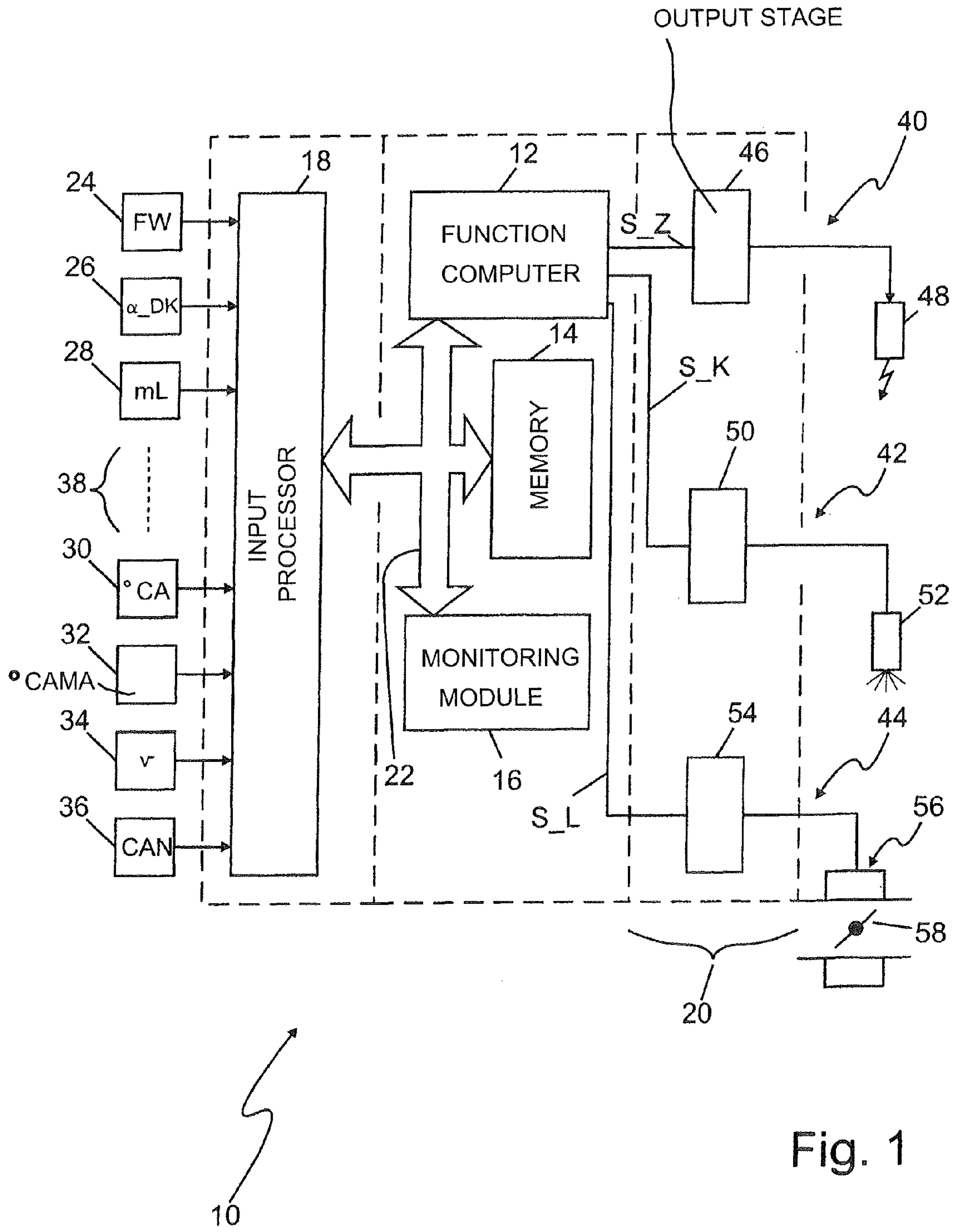
FIG. 1 is a block diagram of a control unit with connected sensors, signal transmitters and actuators according to the invention.

Referring now to the figures of the drawing in detail and first, particularly, to FIG. 1 thereof, there is shown a control unit 10 with a function computer 12, a program memory 14, a monitoring module 16, an input signal processing unit 18, an output signal processing unit 20 and a bus system 22. The input signal processing unit 18 receives input signals from various sensors or signal transmitters about operating parameters of the internal combustion engine and/or a drive train in a motor vehicle. A driver request signal transmitter 24 supplies a signal FW which represents a torque request by the driver. A throttle valve sensor 26 supplies a signal $\alpha$_DK which represents an angle of aperture of a throttle valve. The angle of aperture $\alpha$ is used to vary the air mass flow rate flowing into combustion chambers of the internal combustion engine. An air mass flow rate meter 28 measures the air mass flow rate mL which actually flows into the sum of the combustion chambers. A crankshaft angle sensor 30 senses the angle position °CA of a crankshaft of the internal combustion engine, and a camshaft angle sensor 32 senses the angle position °CAMA of a camshaft of the internal combustion engine. A velocity signal transmitter 34 prepares a signal relating to the velocity v of the motor vehicle, and a CAN bus 36 (CAN=Controller Area Network) is used for communication between the control unit 10 and other control units of the motor vehicle, for example a gearbox control unit and/or a control unit for a traction controller and/or a vehicle movement dynamics controller.

Of course, this enumeration is not meant to be conclusive and more, fewer and/or different signals than the input signals mentioned, from which the control unit 10 can, in particular, determine a measure of a torque which is actually generated by the internal combustion engine, that is to say a torque actual value M_act, can also be fed to the control unit 10. The numeral 38 denotes, for example, such alternative or supplementary input signal transmitters.

After the input signals have been prepared and an analog/digital conversion which is possibly necessary has taken place in the input signal processing unit 18, the function computer 12 forms manipulated variables S_Z, S_K and S_L for actuating an ignition angle path 40, a fuel path 42 and an air path 44. The ignition angle path 40 has one or more ignition output stages 46 and assigned spark plugs 48. The fuel path 42 has one or more output stages 50 for actuating injection valves 52, and the air path 44 has one or more output stages 54 for actuating assigned air mass flow rate actuators 56. An example of an air mass flow rate actuator is a throttle valve actuator with which an angle of aperture $\alpha$_DK of a throttle valve 58 is set. Alternatively or additionally, a charge pressure of an exhaust gas turbocharger and/or a setting of an exhaust gas recirculation valve and/or a valve lift curve of one or more gas exchange valves of a combustion chamber of the internal combustion engine can also be varied in the air path.

The function computer 12 forms the actuation signals S_Z, S_K and S_L by intervening, under usual conditions, in programs and data stored in the program memory 14, with the result that the internal combustion engine generates a torque which is requested by the driver or a control function of the drive train. Control functions of the drive train which request torques are, in particular, functions for limiting the maximum rotational speed, traction control functions or vehicle movement dynamics control operations, functions which are intended to influence a gearshifting operation in the change speed gearbox or the interaction of the gearshifting operation with the drive train as well as load change shock-damping functions. This enumeration is not meant to be conclusive here either. Usual conditions are understood here to be in particular freedom from faults of the function computer.

In contrast, if the function computer operates in a faulty way, under certain circumstances it will output actuation signals S_Z, S_K and S_L with which the internal combustion engine generates more torque than is desired by the driver.

Such a malfunction can lead to dangerous driving situations. In order to prevent this, the monitoring module 16 is provided. Both the function computer 12 and the monitoring module 16 can each be implemented as subprograms of a superordinate engine control program and be processed in the control unit 10 by the same microprocessor. Alternatively, the monitoring module 16 can also be processed as a program by a separate processor of the control unit 10, with the result that the terms of the function computer 12 and of the monitoring module 16, in the form in which they are needed in the present application, respectively comprise both method aspects (software) and device aspects (hardware). The control unit 10 is configured in particular to determine, from a driver request FW, a maximum acceptable torque value M_max of the internal combustion engine, and to determine a torque actual value from operational characteristic variables of the internal combustion engine, and to compare it with the maximum acceptable value M_max and to limit the air supply to the internal combustion engine when the actual value is unacceptably high. Moreover, the control unit is configured, in particular programmed, to carry out the method proposed here and/or one of its refinements.

Figure 2:
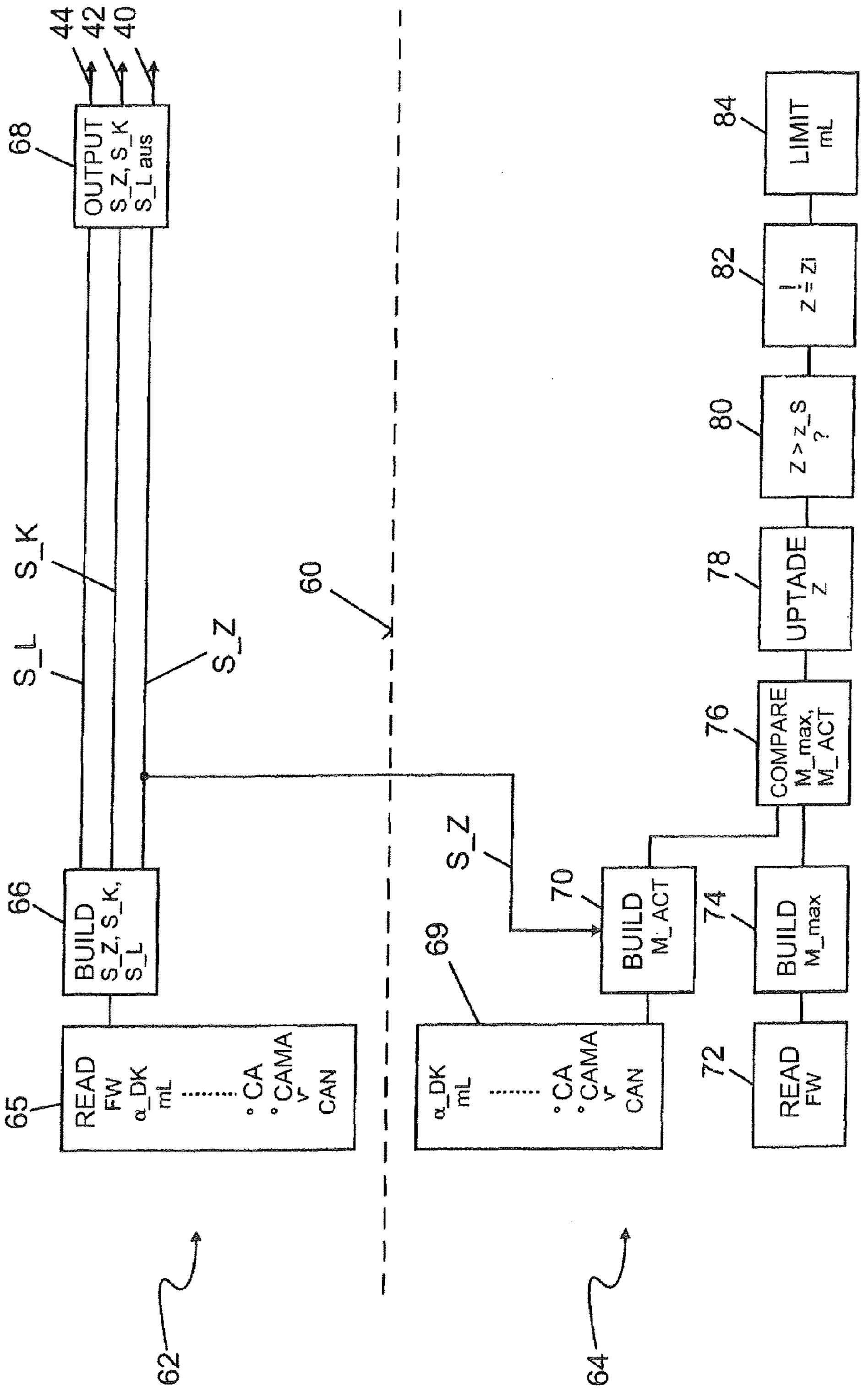
FIG. 2 is a block diagram showing an exemplary embodiment of a method according to the invention.

FIG. 2 shows an exemplary embodiment of a method according to the invention which is embedded in a superordinate program for controlling the internal combustion engine. The method is subdivided into a function level 62 and a monitoring level 64 by the dashed line 60. In the function level, input variables FW, $\alpha$_DK, mL, °CA, °CAMA, v and signals from other control units which are made available via the CAN bus are first read in by block 65. The manipulated variables S_Z, S_K and S_L for actuating the ignition angle path 40, the fuel path 42 and the air path 44 are formed therefrom in the block 66 and output in the block 68 to the actuators 48, 52, 56 via the involved output stages 46, 50, 54.

The manipulated variables S_Z, S_K and S_L are formed and output here in such a way that under usual conditions the internal combustion engine generates a torque M_act which is requested by the driver or by a control unit function. As already mentioned, usual conditions is understood to mean, in particular, fault-free functioning of the formulation of manipulated variables, that is to say fault-free functioning of the involved hardware in the form of the function computer 12 and the program memory 14 as well as the involved software, in particular therefore fault-free functioning of the function level 62.

In the monitoring level 64, input variables FW, $\alpha$_DK, mL, °CA, °CAMA, v and signals from other control units which are made available via the CAN bus are first read in by block 69. The blocks 65 and 69 differ here in their assignment to the various levels 62 and 64 and in the signals to be read in (FW is read in by block 65 but not by block 69). The assignment to the various levels also allows for the fact that the incremental sequences in the levels are repeated with different frequencies: in one refinement the incremental sequence of the function level 62 is repeated, in terms of order of magnitude, after one millisecond while the incremental sequence of the monitoring level 64 is typically repeated with a timing pattern of 40 ms one refinement.

In block 70, a torque actual value M_act is determined computationally (modeled) from the variables which are read in by the block/increment 69. To do this, the block 70 first calculates a theoretically optimum indexed torque of the internal combustion engine from current values for the charging of the combustion chamber with air or air and fuel, the excess air factor lambda, the ignition angle S_Z, the rotational speed and, if appropriate, from further variables which can be derived from the input variables of the function level 62.

An indexed currently present actual torque is formed therefrom as a torque actual value M_act with an efficiency chain. In one refinement, the efficiency chain takes into account three different degrees of efficiency: the cut-off efficiency (proportional to the number of cylinders which fire and combust on a regular basis), the ignition angle efficiency which results from the manipulated variable S_Z as a deviation of the actual ignition angle from the ignition angle which is optimum for the torque, and the lambda efficiency which results from an efficiency characteristic curve as a function of the excess air factor lambda.

By virtue of the inclusion of the cut-off efficiency and the ignition angle efficiency, the modeling of the torque actual value M_act already takes into account whether torque interventions which already have a reducing effect take place via the fuel path and/or the ignition angle path. As has already been mentioned, such quick-acting interventions are used, for example, for vehicle movement dynamics control operations and/or when limiting the rotational speed of the internal combustion engine to a maximum acceptable value.

In addition, in the monitoring level, the block 72 first reads in the driver request FW as a measure of the torque request by the driver. In block 74, a maximum acceptable value M_max for the torque which is to be generated by the internal combustion engine is determined therefrom. The driver request FW forms, as it were, the upper limit for the torque which is to be generated, and functions such as a traction control operation may take away torque but must not demand more torque than the driver. Subsequently, a comparison of the torque actual value M_act formed in the step 70 with the maximum acceptable values M_max from the block 74 takes place in step 76.

A counter reading z is updated in step 78 in dependence on the comparison result. In this context, the update takes place in such a way that the counter reading Z is increased if the comparison in step 76 has revealed that the torque actual value M_act is higher than the maximum acceptable torque value M_max. Analogously, the counter reading is reduced if the comparison in step 76 reveals that the torque value M_act does not exceed the maximum acceptable value M_max. Subsequent to the step 78, a comparison of the updated counter reading z with a threshold value z_S for the counter reading takes place in the step 80. If the counter reading z exceeds the threshold value z_S, this indicates that the torque actual value M_act has exceeded the maximum acceptable value M_max a corresponding number of times.

In this case, in step 82 the counter reading z is reset to an initial value zi, and in step 84 limitation of the air mass flow rate mL flowing into the internal combustion engine is triggered. The limitation takes place, for example, by virtue of the fact that the throttle valve 58 is closed up to a structurally determined residual air gap. The initial value zi is, for example, equal to 0.

A certain degree of fault tolerance is permitted by virtue of the fact that the massive limitation of the air supply which takes place in step 84, and therefore of the torque and of the power of the internal combustion engine, is not triggered until after the counter reading threshold value z_S has been exceeded. This prevents a situation in which, for example, the maximum acceptable torque value M_max being exceeded randomly a single time by the torque actual value M_act already leads to the massive intervention. Genuine malfunctions during which the torque actual value M_act exceeds the acceptable maximum value M_max more frequently or continuously are, in contrast, reliably detected and lead to the, in this case, desired limitation of the torque in step 84. Since the counter reading z is reset to the initial value zi only when the torque limitation operation is triggered in step 84, and is otherwise only reduced in step 78, interfering interactions with interventions by usual functions such as a traction control operation or a rotational speed limiting operation are avoided. This will be explained below with reference to FIG. 3.

Figures 3, 4:
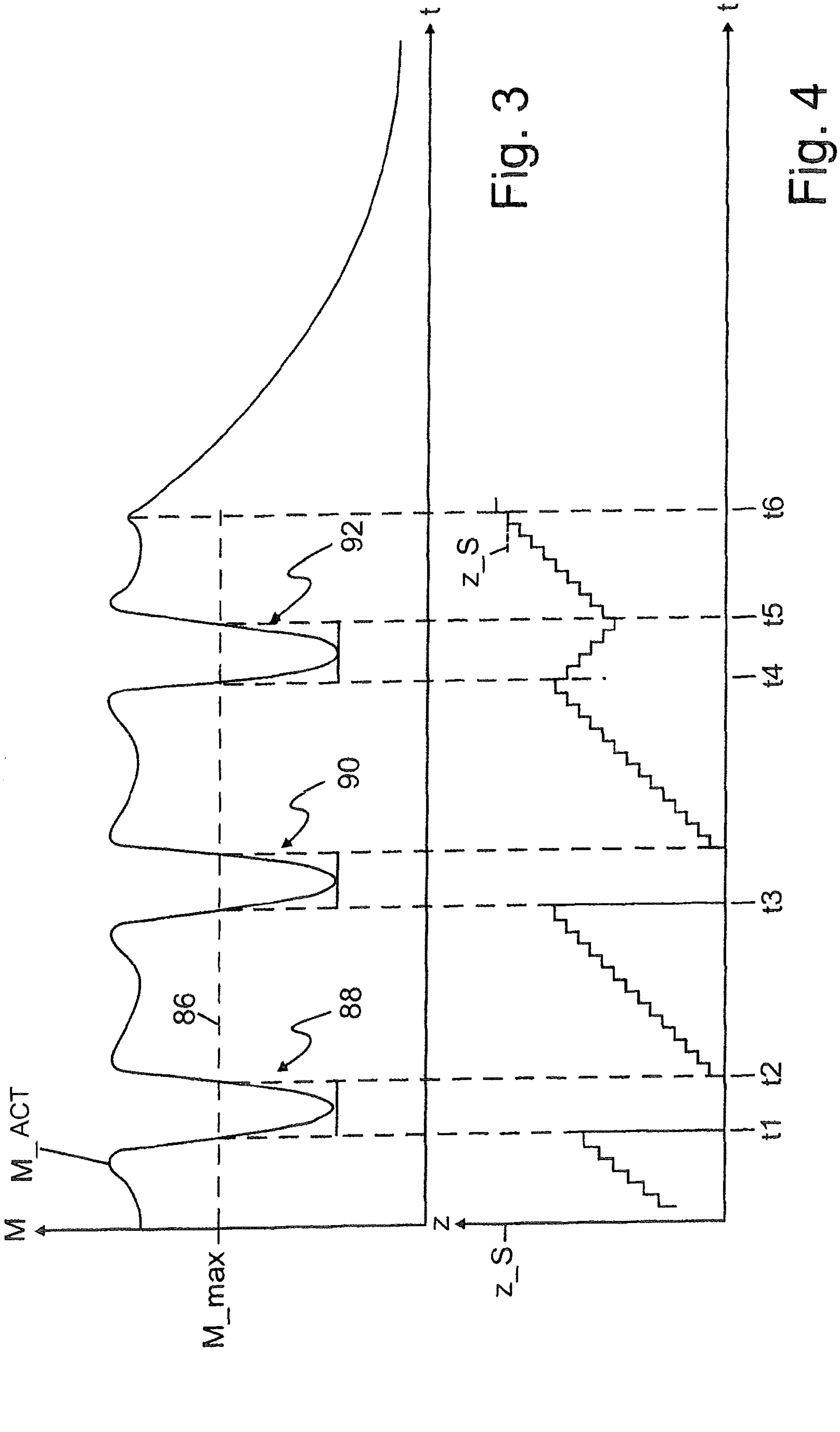
FIG. 3 is a graph showing time profiles of a modeled torque actual value.
FIG. 4 is a graph showing time profiles of a counter reading which is used to trigger limitation of the air supply.

FIG. 3 shows time profiles of a modeled torque actual value M_act in the event of a fault of the function computer 12. FIG. 4 shows chronologically correlating profiles of a counter reading z which is used to trigger a limitation of the air supply.

In FIG. 3, the dashed line 86 denotes the maximum acceptable torque M_max for a specific value of the driver request FW. Depending on the driver request FW, M_max can also assume relatively high or relatively low values. The actual value M_act is initially above M_max. For this reason, the counter reading z in FIG. 4 is initially increased successively. The period between two changes of the counter reading occurs as a result of the frequency with which the method sequence is repeated in the monitoring level 64 in FIG. 2. A typical value of the time interval between two repetitions is approximately 40 milliseconds.

FIG. 4 also shows the threshold value z_s for the counter reading z. Before the counter reading z which rises initially exceeds the threshold value z_S at unacceptably high torque actual values M_act, a temporary dip 88 in torque occurs. Such a dip is typical of an intervention in the fuel path and/or ignition angle path, such as is triggered by a rotational speed limiting function or a traction control operation. Such interventions are taken into account in the modeling of the torque actual value M_act which drops below the maximum acceptable value M_max as a result of the intervention. This is the case at the time t1.

If the counter reading z is then reset to its initial value 0 at the time t1, each short and rapid intervention in the ignition angle path and/or the fuel path leads to a dip 88, 90 in M_act and to resetting of the counter reading z to the initial value z=0. In the illustration in FIGS. 3 and 4, this is the case at the times t1 and t3. If the short and rapid interventions occur only sufficiently quickly one after the other, the time period between the times t2, at which the maximum acceptable value M_max is exceeded, and the time t3, at which the counter reading z is reset to 0 is not sufficient to permit the counter reading z to exceed the threshold value z_S.

In other words: even though the torque actual value M_act (with the exception of the brief dips 88, 90, 92) is continuously too high, limitation of the air supply is not triggered because other functions generate short and rapid interventions which reset the counter reading. These short and rapid interventions occur owing to the fact that the air supply is not reduced when combustion chamber charges are increased incorrectly. This leads to the initially described disruptive behavior of undesirably large amplitudes of the torque fluctuations and to delayed detection of the actual fault.

This problem is achieved by virtue of the fact that the reduction in the fault counter reading when the maximum acceptable torque is undershot by the modeled torque actual value M_act is not equal to the value 0 but rather is usually only a reduction by a predetermined value so that the counter reading z usually remains positive. When the maximum acceptable value M_max is next exceeded, it is increased further starting from a positive counter reading>0. In FIGS. 3 and 4, this procedure is represented in the behavior of the profiles of M_act and z for times t longer than or equal to t4. At first, a pronounced dip 92 in torque ensures that the torque actual value M_act drops below the maximum acceptable value M_max at the time t4. The counter reading z is subsequently reduced by a predetermined value which corresponds to the level of an increment in the refinement in FIG. 4.

This reduction is consequently repeated with the repetition frequency of the method from FIG. 2, with the result that the counter reading z is successively decremented for as long as the torque actual value M_act remains lower than the maximum acceptable value M_max owing to the dip 92 in torque. In the case of a short and pronounced dip 92 in torque, such as is typical of interventions in the ignition angle path and in the fuel path when there is at the same time a large charge in the combustion chamber, the torque actual value M_act will exceed the maximum acceptable value M_max again before the counter reading z has been decremented to 0. In the illustration in FIG. 4, the maximum acceptable value M_max is exceeded at the time t5, which leads again to a successively occurring increase in the counter reading z. In contrast to the increases in the counter reading after the time t2, the increase occurring from the time t5 does not, however, occur with the starting value 0 but rather with a positive starting value which is different from 0. As a result, during the subsequent further incrementing the threshold value z_S for the counter reading z is reached and/or exceeded before a further dip in torque occurs as a result of an intervention in the ignition angle path and/or in the fuel path.

When the counter reading threshold value z_S is exceeded at the time t6, the air supply to the internal combustion engine is limited. As a result, the torque M_act drops below the maximum acceptable value M_max.

Of course, the fault counter reading can also be reduced with a relatively large increment. It may then be found that at a counter reading which is lower before reduction than the magnitude of an anticipated reduction, the counter reading would be negative after the reduction. In this case, one refinement provides for the counter reading to be reduced to 0. In other words, the counter reading z is either reduced to a positive value or reduced to the value zero if the counter reading remaining after the reduction by the predetermined value would be equal to zero or would be negative.

In the refinement described above, the method is carried out in parallel with interventions which are triggered by a usual function such as a traction control operation or a rotational speed limiting operation. A supplementary refinement provides that if no interventions by usual functions take place in parallel, an increased fault counter reading z is reset to an initial value, for example the value 0, for the fault counter reading when the maximum value is undershot. As a result, the probability of the massive limitation in torque being unnecessarily triggered by limitation of the air supply drops. The detection of fault is, as it were, less sensitive and the motor controller, as it were, more robust. In contrast, when interventions occur in parallel, the more sensitive fault detection operation is carried out.

A further refinement provides for the more sensitive method to be carried out above a rotational speed threshold and for an increased fault counter reading below the rotational speed threshold to be reset to an initial value for the fault counter reading when the maximum value is undershot, with the result that the less sensitive fault detection is carried out below the rotational speed threshold, i.e. in a lower power range, which is less critical in terms of the power of the internal combustion engine.

The invention claimed is:

1. A method for monitoring a function computer in a control unit which controls a generation of torque by an internal combustion engine, which comprises the steps of:
- determining a maximum acceptable torque value from a driver request;
- determining a torque actual value from operational characteristic variables of the internal combustion engine;
- comparing the maximum acceptable torque value to the torque actual value;
- limiting an air supply when the torque actual value is unacceptably large;
- performing the limiting step when a fault counter reading exceeds a threshold value;
- increasing the fault counter reading if the torque actual value is higher than the maximum acceptable torque value; and
- reducing the fault counter reading by a predetermined value if the torque actual value is lower than the maximum acceptable torque value.

2. The method according to claim 1, which further comprises performing one of reducing the fault counter reading to a positive value and reducing the fault counter reading to a value zero if a counter reading remaining after a reduction by the predetermined value would be equal to zero or would be negative.

3. The method according to claim 1, which further comprises carrying out the method in parallel with interventions triggered by a usual function.

4. The method according to claim 3, which further comprises resetting an increased fault counter reading to an initial value for the fault counter reading when the maximum acceptable torque value is undershot if no interventions by the usual functions take place in parallel.

5. The method according to claim 3, wherein the usual function is a traction control operation.

6. The method according to claim 3, wherein the usual function is an operation for limiting a maximum rotational speed.

7. The method according to claim 3, which further comprises performing the interventions triggered by the usual function in one of a fuel path and an ignition angle path.

8. The method according to claim 1, which further comprises carrying out the method above a rotational speed threshold, and in that an increased fault counter reading below the rotational speed threshold is reset to an initial value for the fault counter reading when the maximum acceptable torque value is undershot.

9. The method according to claim 1, which further comprises limiting a generation of torque by limiting the air supply to the internal combustion engine in an event of a fault.

10. A control unit for monitoring a function computer controlling a generation of torque by an internal combustion engine, the control unit comprising:
- a control module programmed to:
  - determine, for monitoring purposes, a maximum acceptable torque value from a driver request;
  - determine a torque actual value from operational characteristic variables of the internal combustion engine;
  - compare the torque actual value with the maximum acceptable torque value;
  - limit an air supply to the internal combustion engine when the torque actual value is unacceptably high;
  - increase a fault counter reading if the torque actual value is higher than the maximum acceptable torque value and reduce the fault counter reading by a predetermined value if the torque actual value is lower than the maximum acceptable value; and
  - trigger the limiting step if the fault counter reading exceeds a threshold value.

11. The control unit according to claim 10, wherein said control module is further programmed to perform one of reducing the fault counter reading to a positive value and reducing the fault counter reading to a value zero if a counter reading remaining after a reduction by the predetermined value would be equal to zero or would be negative.

12. The control unit according to claim 10, wherein said control module is further programmed to carry out the programmed steps in parallel with interventions triggered by a usual function.

13. The control unit according to claim 12, wherein said control module is further programmed to reset an increased fault counter reading to an initial value for the fault counter reading when the maximum acceptable value is undershot if no interventions by the usual functions take place in parallel.

14. The control unit according to claim 12, wherein the usual function is a traction control operation.

15. The control unit according to claim 12, wherein the usual function is an operation for limiting a maximum rotational speed.

16. The control unit according to claim 12, wherein said control module is further programmed to perform the interventions triggered by the usual function in one of a fuel path and an ignition angle path.

17. The control unit according to claim 10, wherein said control module is further programmed to carry out the method above a rotational speed threshold, and in that an increased fault counter reading below the rotational speed threshold is reset to an initial value for the fault counter reading when the maximum acceptable torque value is undershot.

18. The control unit according to claim 10, wherein said control module is further programmed to limit a generation of torque by limiting the air supply to the internal combustion engine in an event of a fault.

* * * * *